United States Patent
Choi et al.

(10) Patent No.: US 7,234,049 B2
(45) Date of Patent: Jun. 19, 2007

(54) COMPUTER SYSTEM WITH NAND FLASH MEMORY FOR BOOTING AND STORAGE

(75) Inventors: Young-Joon Choi, Kyunggi-do (KR); Seok-Heon Lee, Kyunggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 399 days.

(21) Appl. No.: 10/629,049

(22) Filed: Jul. 28, 2003

(65) Prior Publication Data

US 2004/0017708 A1 Jan. 29, 2004

(30) Foreign Application Priority Data

Jul. 29, 2002 (KR) ...................... 10-2002-0044638

(51) Int. Cl.
*G06F 9/00* (2006.01)
*G11C 29/16* (2006.01)

(52) U.S. Cl. ............... 713/1; 365/233; 365/185.17; 707/202; 713/2; 711/103; 235/492

(58) Field of Classification Search ............... None
See application file for complete search history.

(56) References Cited

U.S. PATENT DOCUMENTS

| 5,535,357 | A | | 7/1996 | Moran et al. |
| 6,098,077 | A | * | 8/2000 | Sassa ................... 707/202 |
| 6,279,069 | B1 | * | 8/2001 | Robinson et al. ....... 711/103 |
| 6,601,167 | B1 | * | 7/2003 | Gibson et al. ............. 713/2 |
| 2002/0039325 | A1 | * | 4/2002 | Aizawa .................. 365/233 |
| 2003/0075609 | A1 | * | 4/2003 | Kim ....................... 235/492 |
| 2003/0135690 | A1 | * | 7/2003 | Lee et al. ................ 711/103 |
| 2003/0172261 | A1 | * | 9/2003 | Lee et al. .................. 713/1 |
| 2003/0206442 | A1 | * | 11/2003 | Tang et al. .......... 365/185.17 |

* cited by examiner

*Primary Examiner*—Rehana Perveen
*Assistant Examiner*—Fahmida Rahman
(74) *Attorney, Agent, or Firm*—Marger Johnson & McCollom, P.C.

(57) ABSTRACT

A computer system includes a system controller with a central processing unit and a memory bus controller operating in a first interface mode; a system memory connected with the system controller through the system bus; a NAND flash memory for storing a system driving code, an operating system program and user data for the computer system; and an interface unit communicating with the system controller through the system bus in the first interface mode and communicating with the NAND flash memory in a second interface mode, the interface unit being synchronized with a clock signal generated therein in response to predetermined command and operating information. The NAND flash memory may be used for the system bootstrap, and data transmission to the system controller during reading or programming operations is performed successively to reduce the latency time on the read operation and the data loading time on the programming operation.

7 Claims, 11 Drawing Sheets

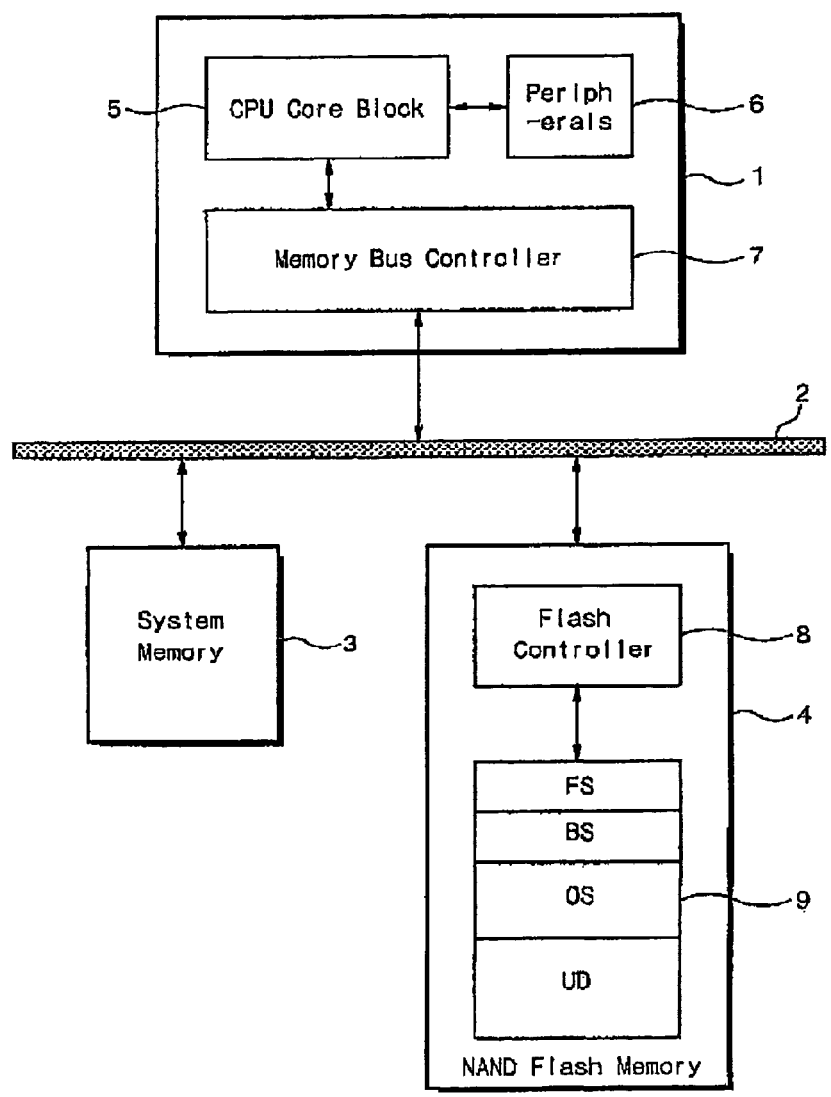
Fig. 1
(CONVENTIONAL)

COMPUTER SYSTEM WITH NAND FLASH MEMORY FOR BOOTING AND STORAGE

CROSS REFERENCE TO RELATED APPLICATIONS

This application claims priority from Korean Patent Application No. 2002-44638, filed on Jul. 29, 2002, the contents of which are hereby incorporated by reference in their entirety for all purposes.

BACKGROUND OF THE INVENTION

1. Technical Field of the Invention

This disclosure relates to a computer system with a NAND flash memory for booting and storage.

2. Description of the Related Art

In a system such as a general PDA, a mobile phone, a set top box, or the like, ROM or NOR flash memory is mainly used for the system drive memory and NOR flash memory is used as the data storage memory. Flash memory is suitable for data storage because it has a volatility in which data can be written and erased and no refresh is needed. In particular, NOR flash memory is widely being used for booting and storage in systems that do not require a high speed interface.

With the growth of the system market, a memory capable of supporting high speed access, having large capacity, as well as being cost-effective due to service variety and high functionality has been requested. However, the conventional NOR flash memory does not fulfill such a request. Although conventional DRAM meets such a request at present, it is a volatile memory and is not suitable for data storage.

In the meantime, since the NAND flash memory is easy to realize, has a large capacity, and is cost-effective compared with the NOR flash memory, it is widely used as a large capacity memory. Also, since the NAND flash memory is easy to fabricate and has a good integrity, its use as a booting memory has been proposed.

In U.S. Pat. No. 5,535,357, issued to Moran et al., entitled "Flash memory system providing both BIOS and user storage capability", an example of a flash memory used as a booting memory is disclosed. Referring to FIG. 1, in order to use a NAND flash memory as the booting memory, a flash controller 8 performs an interfacing between a NAND flash memory 4 and a system bus 2. Here, the NAND flash memory 4 has to store a separate emulation means. The emulation means is indicative of means for using a region of the NAND flash memory as the hard disk. The flash controller 8 intercepts the BIOS booting process and installs the emulation means in a system memory 3. In the construction of FIG. 1, the system booting is performed as follows.

First, a jump address for a BIOS region BS (located at block 1) is stored in a file system region FS (located at block 0) of a NAND flash memory 4. A memory mapping to the BIOS block BS is performed using a memory mapping circuit (or window circuit) arranged in the flash controller 8. With the memory mapping, an operating system region OS is moved to the system memory 3 to subsequently perform the system booting.

However, in order to use the NAND flash memory as the system booting memory by the aforementioned conventional method, the NAND flash memory 4 should be partitioned into the file system region FS, the BIOS region BS, the operating system region OS and the user data region UD as shown in FIG. 1. Also, the NAND flash memory 4 must have the emulation means which allows the NAND flash memory 4 to be recognized as the hard disk. In addition, the flash controller 8 must have the functionality to intercept the BIOS operating process and means for performing an address mapping to the BIOS region BS.

In the aforementioned conventional method, preparing to use the NAND flash memory and the flash controller as a booting memory and the necessary operational steps are complicated. Consequently, it is not easy to apply the conventional method to a general computer system.

Embodiments of the invention address these and other disadvantages of the conventional art.

SUMMARY OF THE INVENTION

Embodiments of the invention provide a device that enables an easier use of a NAND flash memory as a booting and storage memory in a general computer system.

Embodiments of the invention also provide a device that enables the performance of an interfacing function more easily and efficiently in a computer system in which a NAND flash memory is used for booting and data storage.

Embodiments of the invention also provide an interface unit performing data reading from and programming operations in a NAND flash memory used for booting and data storage in a computer system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiments of the invention and together with the written description serve to explain aspects of the invention.

FIG. 1 is a block diagram of a conventional computer system.

DETAILED DESCRIPTION OF THE INVENTION

Reference will now be made in detail to the preferred embodiments of the invention, examples of which are illustrated in the accompanying drawings. However, the invention is not limited to the embodiments illustrated hereinafter, rather the embodiments described are introduced to provide easy and complete understanding of the scope and spirit of the invention.

Figure 2:
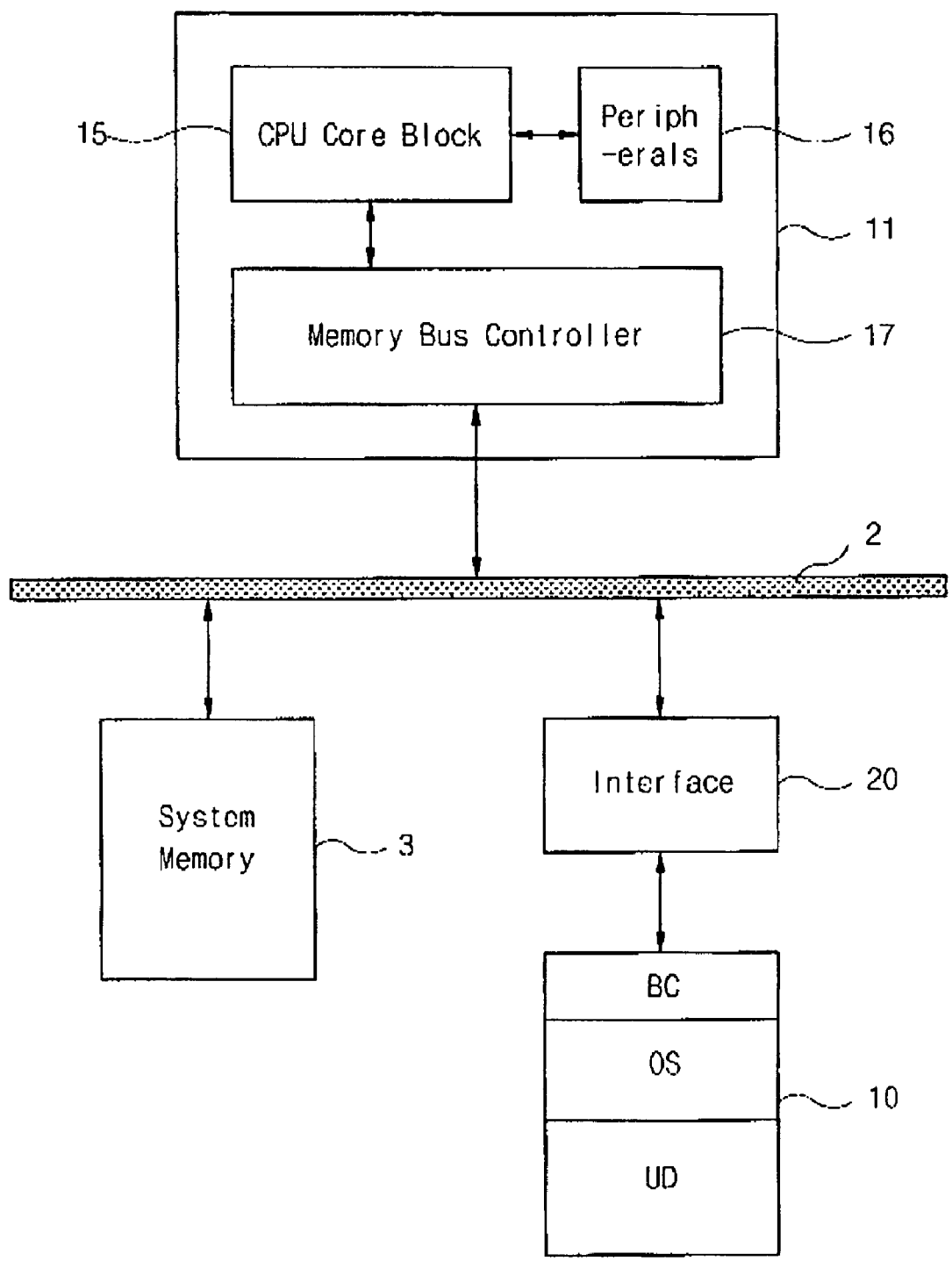
FIG. 2 is a block diagram of a computer system according to an embodiment of the invention.

FIG. 2 illustrates a construction of a computer system according to an embodiment of the invention. Referring to FIG. 2, the computer system includes a system controller 11 such as a central processing unit (CPU), a system bus 2, a system memory 3 such as DRAM, a NAND flash memory 10 whose storage region is divided, and an interface unit 20 for interfacing data or signals between the system bus 2 and the NAND flash memory 10.

The system bus 2 connects the system controller 11, the system memory 3 and the interface unit 20 one another. The NAND flash memory 10 is used as a system bootstrap device as well as a data storage device. The NAND flash memory 10 has an internal data region divided into three storage regions, i.e., BC, OS and UD regions. The BC region stores system bootstrap codes, the OS region stores information on the operating system, and the UD region stores general user data. The storage regions BC, OS and UD are divided according to kinds of data to be stored, and each storage region consists of a plurality of pages. The interface unit 20 is provided to operate for the system controller 11 which does not support the conventional NAND flash controller. The system controller 11 is provided with a core block 15, a peripheral circuit 16 and a memory bus controller 17. The memory bus controller 17 supports a program memory controller and a NOR flash memory controller, not an interface for NAND flash memory.

Figure 3A:
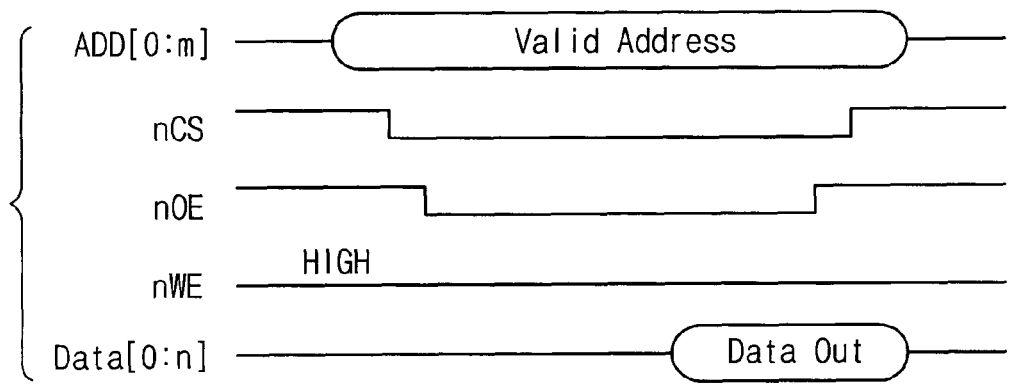
FIGS. 3A and 3B are timing diagrams showing read operations of a NOR flash memory and a NAND flash memory, respectively.
Figure 3B:
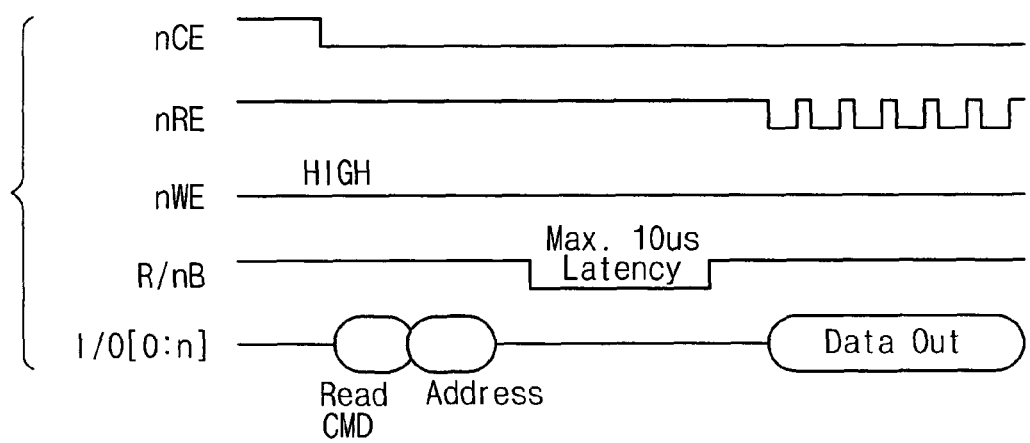

The interface unit 20 interfaces with the memory bus controller 17 through the system bus 2 in a NOR flash interface mode and with the NAND flash memory 10 in a NAND flash interface mode. FIGS. 3A and 3B illustrate read operations in the NOR flash interface mode and the NAND flash interface mode, respectively. While the NOR flash memory can carry out a random access read operation, the NAND flash memory carries out the read operation by page unit rather than the random access read and requires a maximum latency time of 10 µs. Due to the difference between the NOR flash interface mode and the NAND flash interface mode, the interface unit 20 of FIG. 2 is required to use the NAND flash memory in a computer system which does not support the NAND flash interface mode.

Figure 4:
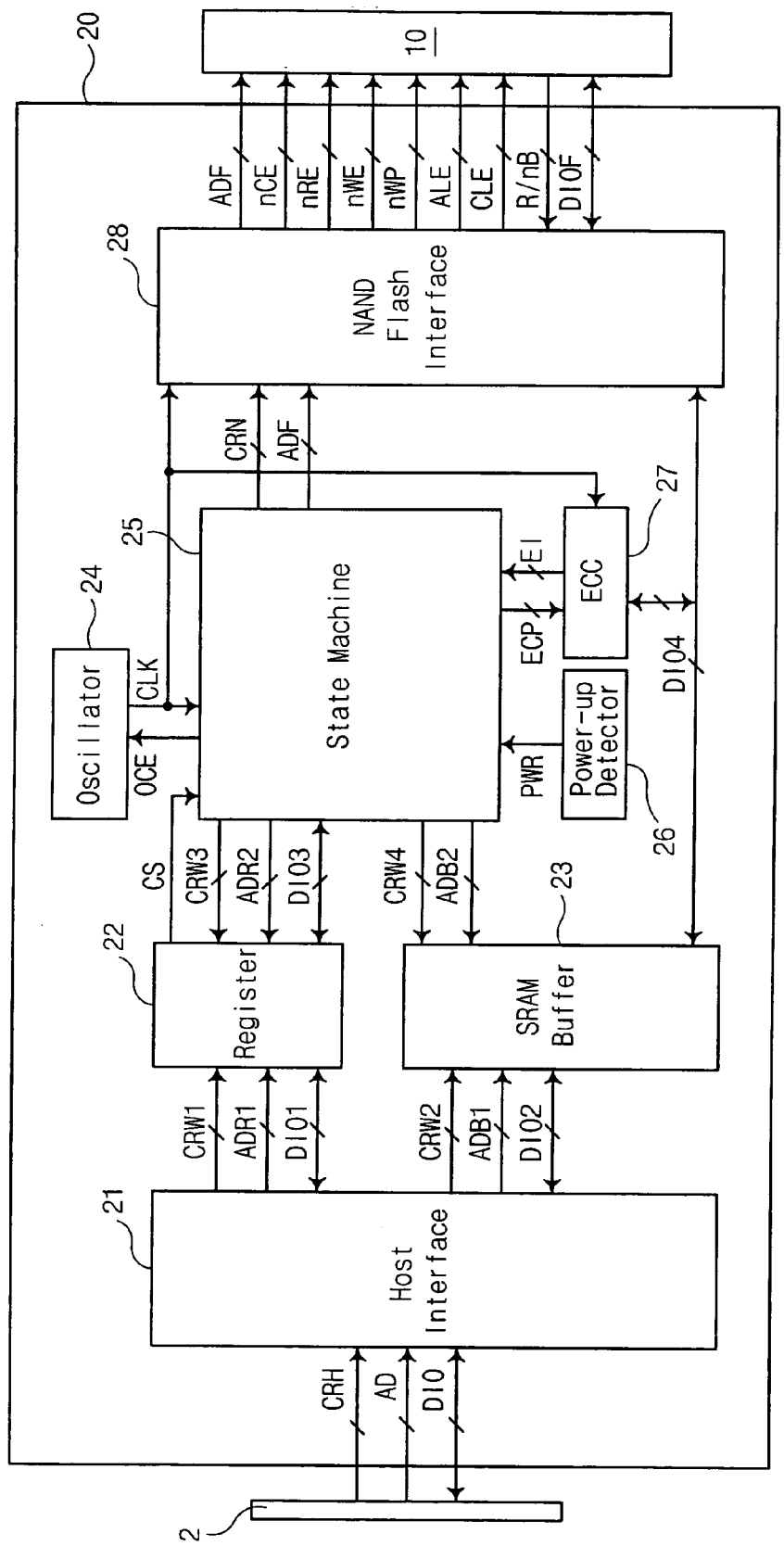
FIG. 4 is a block diagram illustrating the inner construction of the interface unit of FIG. 2.

As shown in FIG. 4, the interface unit 20 includes a host interface unit 21, a register unit 22, a buffer unit 23, an oscillator 24, a state machine 25, a power-up detector 26, an error correction circuit (ECC) 27, and a NAND flash interface unit 28.

In order to provide the NOR flash interface function between the interface unit 20 and the system controller 11, the host interface unit 21 exchanges address signals AD, data input/output signals DIO and control signals CRH with the system bus 2 connected to the system controller 11. The address signals AD include address signals used to store data in the SRAM register unit 22, the SRAM buffer unit 23, and the NAND flash memory. The data signals DIO are read out/programmed from/into the NAND flash memory 10. The control signals CRH include control signals for operating the interface unit 20. The register unit 22 stores information related to the computer system configuration and command in response to control signals CRW1 and address signals ADR1, which are provided through the host interface unit 21. As one example of the information related to the system configuration and command, data signals DIO1 are exchanged between the host interface unit 21 and the register unit 22. The buffer unit 23 temporarily stores data to be read out/programmed from/into the NAND flash memory 10 in response to control signals CRW2 and address signals ADB1, which are provided through the host interface unit 21. Data signals DIO2 exchanged between the host interface unit 21 and the buffer unit 23 are data signals that are read out from the NAND flash memory 10 and transmitted to the system controller 11, or data signals that are provided from the system controller 11 and programmed into the NAND flash memory 10.

The register unit 22 and the buffer unit 23 are provided with SRAMs. The register unit 22 includes configuration registers and command registers. For example, the configuration registers store information on characteristics of the NAND flash memory 10 controlled by the interface unit 20. The characteristics include information on an IO depth (×8 or ×16), a page size, a bit density, and error correction or non-correction. In case a write command is inputted to a corresponding address, the command registers executes the write command and a command start signal CS is applied from the command register to the state machine 25. The register unit 22 exchanges data signals DIO3 related to the system configuration and command with the state machine 25 in response to control signals CRW3 and address signals ADR2, which are inputted from the state machine 25 in order for internal operations. The buffer unit 23 exchanges data signals (system bootstrap code, read data or program data) DIO4 with the NAND flash memory 10 through the NAND flash interface unit 28 in response to control signals CRW4 and address signals ADB2, which are provided from the state machine 25.

The oscillator 24 generates a clock signal CLK for synchronizing an internal operation of the interface unit 20 in response to an activation signal OCE provided from the state machine 25. The clock signal CLK is provided to the error correction circuit 27 and the NAND flash interface unit 28. Although the clock signal CLK can be provided from a source external to the interface unit 20, e.g., the system controller 11 of FIG. 2, through the host interface unit 21, the reason why the clock signal is generated internally inside the interface unit 20 is to reduce a current consumption. In other words, the clock signal is not always applied to the interface unit 20 from its exterior but if a command is applied from an exterior of the interface unit 20 and set into the command register of the register unit 22, the oscillator 24 operates and thus the state machine 25 performs predetermined operations. If all operations are completed, the oscillator 24 stops its operation.

Figure 5:
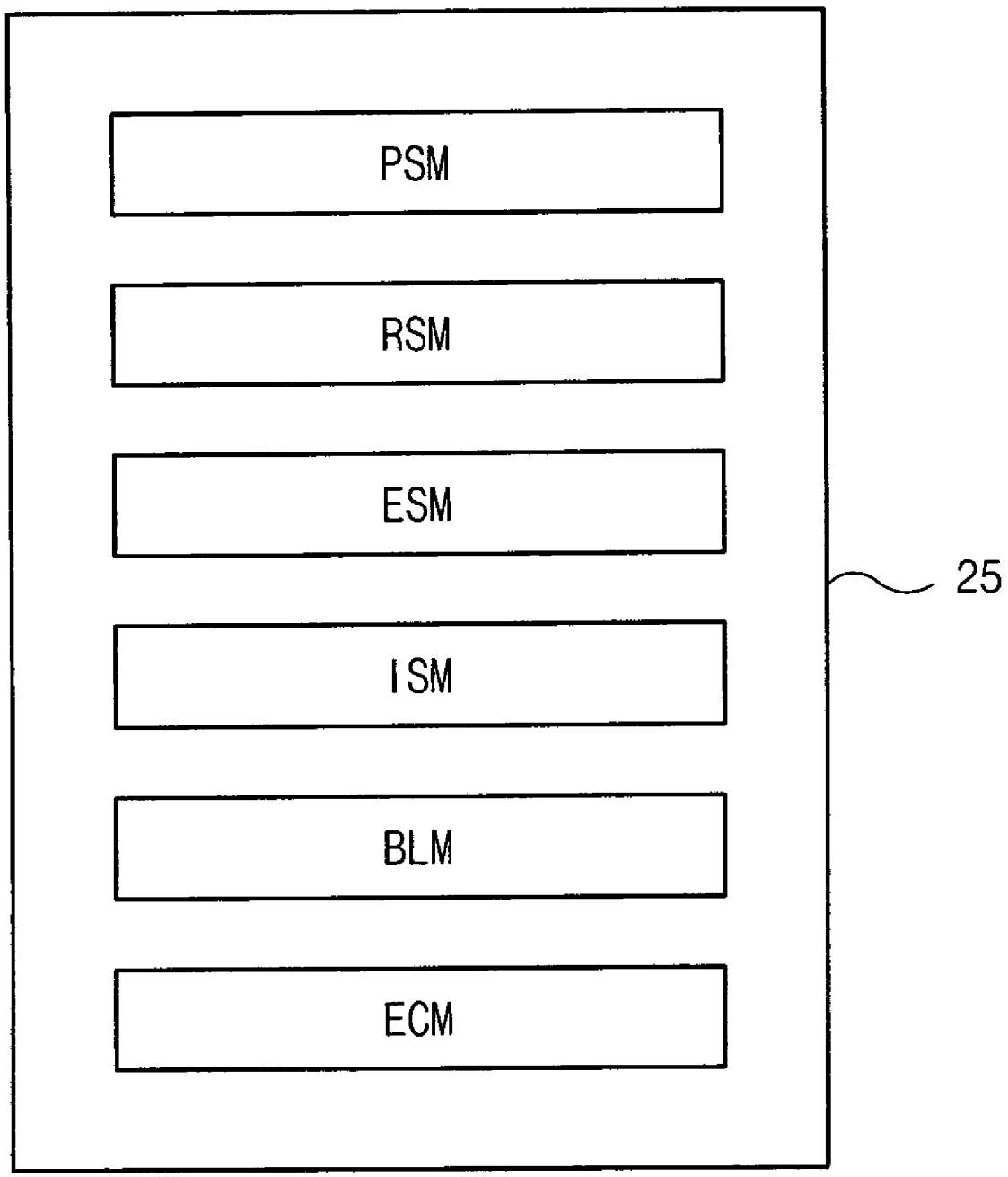
FIG. 5 is a block diagram showing functional constructions of the state control unit of FIG. 4.

The state machine 25 functions as a central processing unit that manages and controls the operation of the interface unit 20. As shown in FIG. 5, the state machine 25 is divided into a program state machine PSM, a read state machine RSM, an erasure state machine ESM, an interrupt state machine ISM, a bootstrap loading state machine BLM, and an ECC state machine ECM on the basis of functions.

The program state machine PSM controls an operation of programming data stored in the buffer unit 23 into an address that was previously assigned to the NAND flash memory 10, and also controls an operation of storing parity bits generated by the ECC state machine ECM into a spare address that was previously assigned to the NAND flash memory 10. The read state machine RSM controls an operation of storing data read out from the NAND flash memory 10 into address that was previously assigned to the buffer unit 23. The erasure state machine ESM controls an operation of erasing data stored in an address that is assigned to the NAND flash memory 10. The interrupt state machine ISM controls reset operations to the NAND flash memory 10 and the registers of the interface unit 20. The bootstrap loading state machine BLM includes a bootstrap circuit and controls an operation of transmitting the bootstrap code stored in the NAND flash memory 10 to the buffer unit 23 in response to the power-up detection signal PWR which is an output of the power-up detector 26. Also, the bootstrap loading state machine BLM can share with the read state machine RSM. The bootstrap loading state machine BLM performs a general read operation and allows a page read operation to be performed in pipelined fashion according to predefined bootstrap codes. For example, assuming that the bootstrap code region BC of the NAND flash memory 10 is assigned to eight pages and a size of the buffer unit 23 contained in the interface unit 20 is equal to or larger than eight pages, eight-page data are read out from the BS region of the NAND flash memory 10 in pipelined fashion and transmitted to the buffer unit 23. The ECC state machine ECM controls an operation of generating parity bits during the program operation of the NAND flash memory 10, and performs an operation of correcting data of corresponding address by comparing stored parity bits with new parity bits during the read operation.

When the power is supplied to the computer system of FIG. 2, the power-up detector 26 generates the power-up detection signal PWR to initiate the internal registers, and activates the bootstrap loading state machine BLM of the state machine 25. In response to the error checking signal ECP provided from the state machine 25, the error correction circuit (ECC) 27 performs data error detection and correction using the parity bits generated during the data read and program with respect to the NAND flash memory 10. The error correction circuit 27 simultaneously receives data transmitted between the NAND flash interface unit 28 and the buffer unit 23 and generates error correction codes. If there is a single bit error, the error correction circuit 27 corrects the signal bit error and transmits a corresponding error information signal E1 to the state machine 25. The NAND flash interface unit 28 transmits command and control signals CRN and address signals ADF for the NAND flash memory, which are provided from the state machine 25, to the NAND flash memory 10 in the NAND flash interface mode, and interfaces data exchange between the NAND flash memory 10 and the interface unit 20. Accordingly, through the NAND flash interface unit 28, the NAND flash memory 10 provides the control signals required for the operations, i.e., a chip enable signal nCE, a read enable signal nRE, a write enable signal nWE, a write protect signal WP, an address latch enable ALE, a command latch enable signal CLE, and address signals ADF, receives a ready/busy signal R/nB, and exchanges data signals DIOF (bootstrap code, read or program data) with the NAND flash memory 10.

The power-up detector 26 and the error correction circuit 27, which are provided within the interface unit 20 of FIG. 4, can be installed outside the interface unit 20. For example, instead of the power-up detection signal PWR outputted from the power-up detector 26, a system reset signal applied externally to the interface unit 20 can be used to start the system bootstrapping.

Hereinafter, there will be made a detailed description about the operations of the invention in the computer system using the interface unit 20 in the case when the NAND flash memory 10 is used for the system bootstrapping and storage. The operations of the invention are divided into a system bootstrapping operation using the NAND flash memory 10, a read operation to the NAND flash memory 10, and a program operation to the NAND flash memory 10. It should be understood that the other operations of the NAND flash memory 10, e.g., an erase operation, an erase/program verification operation, etc., are basic operations known to those of ordinary skill, and their descriptions will be omitted below.

Figure 6:
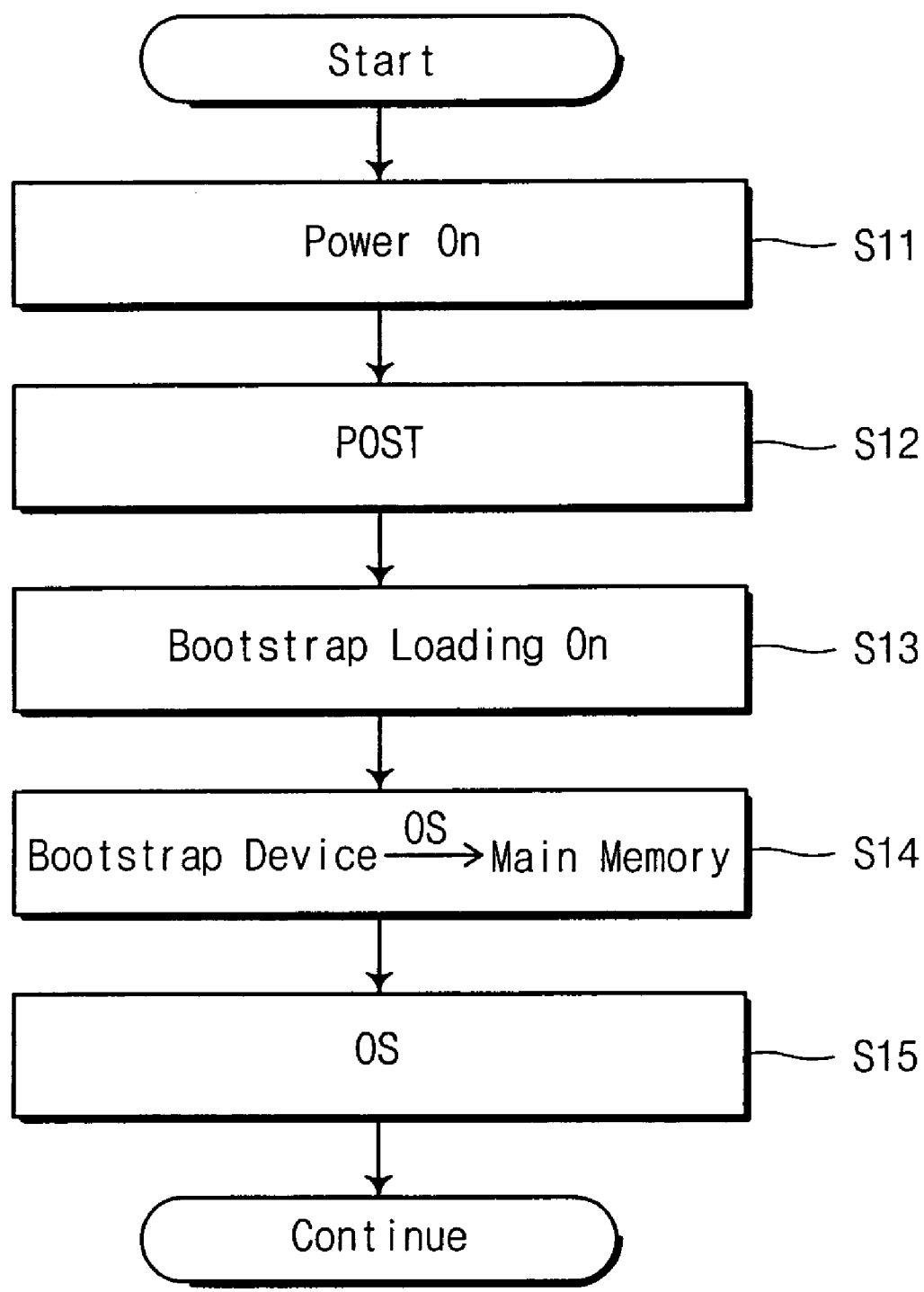
FIG. 6 is a flowchart showing an operational flow of the computer system of FIG. 2.

FIG. 6 is a flowchart showing a basic process of an overall system bootstrapping in the computer system of FIG. 2. Referring to FIG. 6, if the power is on (S11), a power-on self test (POST) is carried out (S12). Here, the power-on self test (POST) is a process where the system controller 11 initiates and inspects respective hardware devices according to the BIOS routine to ascertain whether or not the peripheral devices 16, e.g., the memory devices or hard disks, operate normally. If, after the POST process, there is no malfunction in the hardware connected to the computer system, a bootstrap loading process from a bootstrap memory (i.e., the NAND flash memory 10) is carried out (S13). Then, an operating system (OS) program stored in the NAND flash memory 10 is loaded into the main memory (i.e., the system memory 3) (S14). The OS program retrieves information that is set to hardware and software of the computer system, and is executed to allow the computer system to operate normally (S15).

Figure 7:
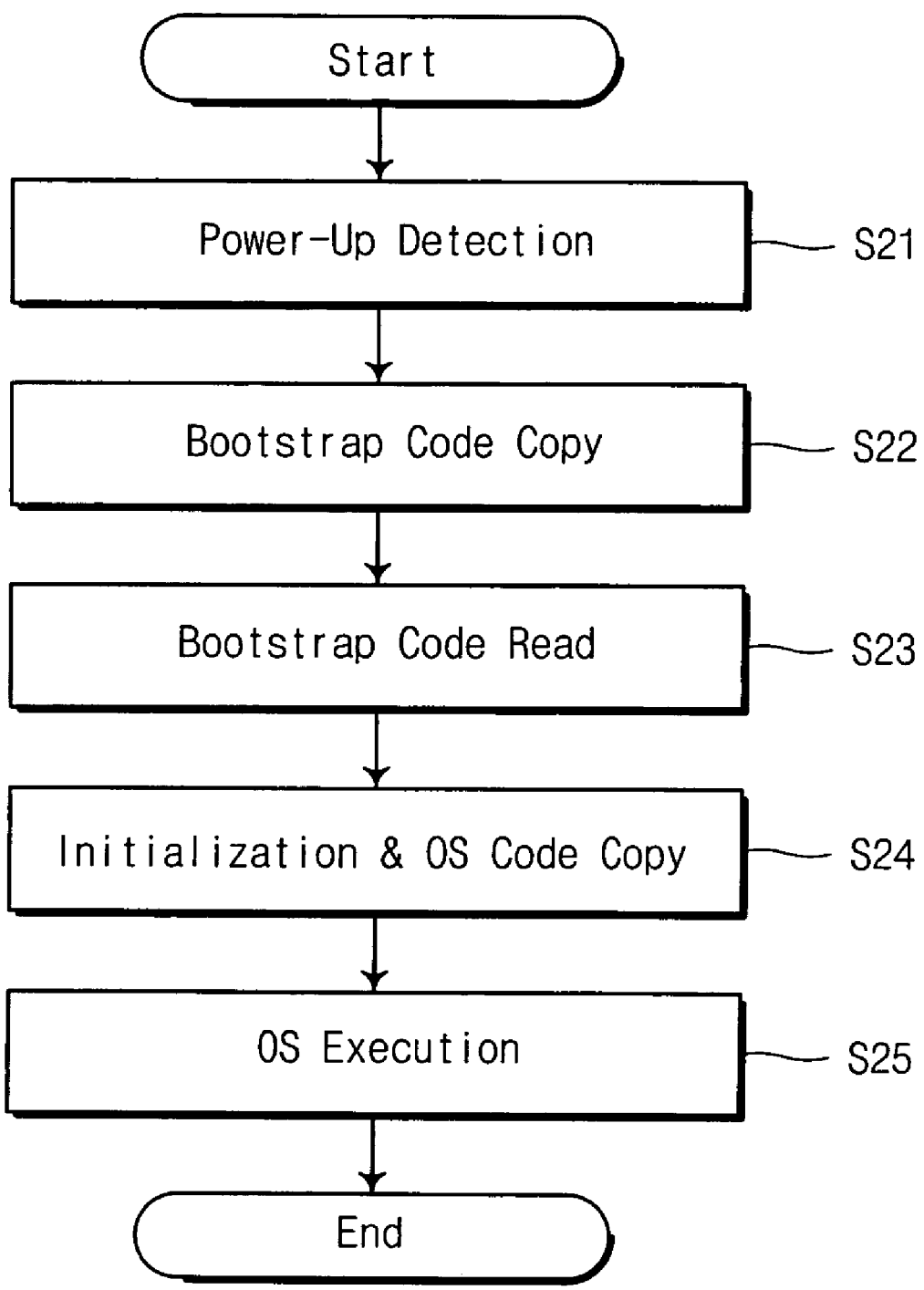
FIG. 7 is a flow diagram showing an operational flow of the computer system of FIG. 2 when a NAND flash memory is used for the system operation.

A detailed description about the process of bootstrapping the computer system of FIG. 2 using the NAND flash memory 10 as the bootstrap memory will now be made. Referring to FIG. 7, if the computer system of FIG. 2 is powered on (S21), the power-up detector 26 generates the power-up detection signal PWR and informs the bootstrap loading state machine BLM contained in the state machine 25 of the power-up detection. Here, instead of using the power-up detector 26, the bootstrap loading state machine BLM can be informed of the power-up detection in response to the system reset signal.

If the power-up detection is checked, the bootstrap loading state machine BLM copies the bootstrap code stored in the NAND flash memory 10 to the buffer unit 23 (S22). The system controller 11 reads out the bootstrap code from the buffer unit 23 (S23). Additionally, the system controller 11 initializes the hardware devices of the computer system and then copies the OS program, which is stored in the NAND flash memory 10, to the system memory 3 (S24). Here, the step S24 corresponds to the step S14 of FIG. 6. Then, the system controller 11 executes the OS program stored in the system memory 3 to operate the computer system (S25). Here, the step S25 corresponds to the step S15 of FIG. 6.

The bootstrap code used in this invention is a code for initializing the hardware devices of the computer system and loading the OS program into the system memory 3, and consists of a hardware initialization code and an OS program copy code. Additionally, if necessary, the bootstrap code can contain an interrupt vector which is executed when an interrupt command is applied to the system.

Since the NAND flash memory 10, as described above, is used as the bootstrap memory and also has the basic functions, such as the erase, program and read functions, the interface unit 20 can be allowed to support an interface environment between the system controller 11 and the NAND flash memory 10 in the case where the system controller 11 does not support the NAND flash interface function (most conventional system controllers have supported NOR flash interface function). In other words, as shown in FIGS. 2 and 3, the interface unit 20 performs the NOR flash interface function through the system controller 11 and the host interface unit 21, and performs the NAND flash interface function through the system controller 11 and the NAND flash interface unit 28. In order to improve the performance of NAND flash memory, the interface unit 20 performs two processing methods, i.e., an interleaved read and an interleaved program.

Figure 8:
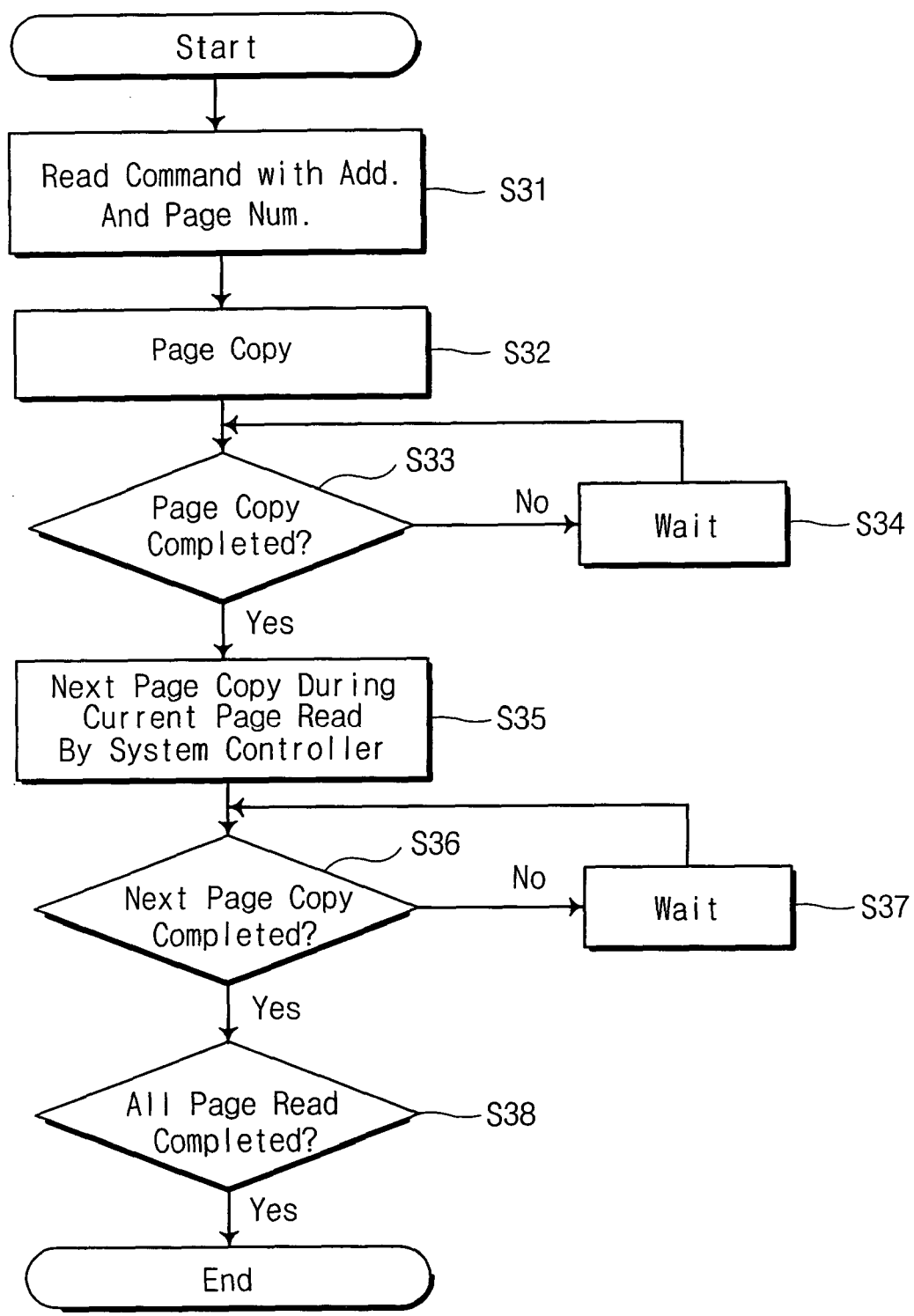
FIGS. 8 and 9 are flowchart and timing diagrams showing a data read operation from a NAND flash memory using the interface unit of FIG. 4.
Figure 9:
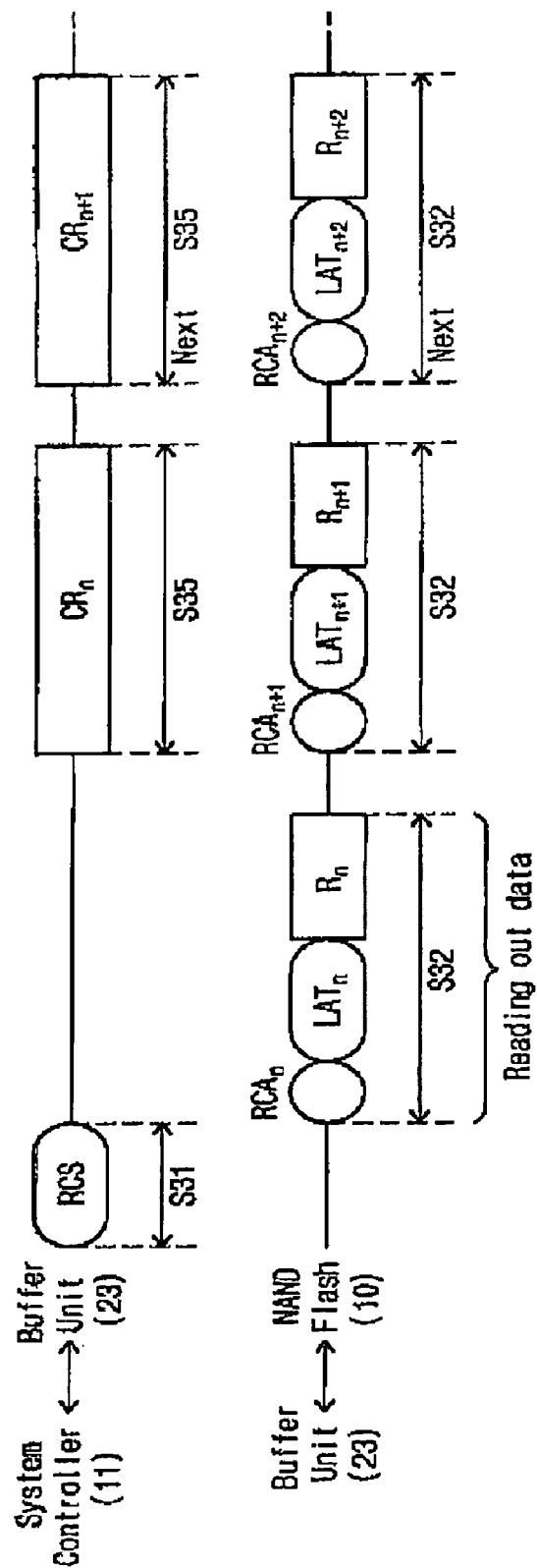
Figure 10:
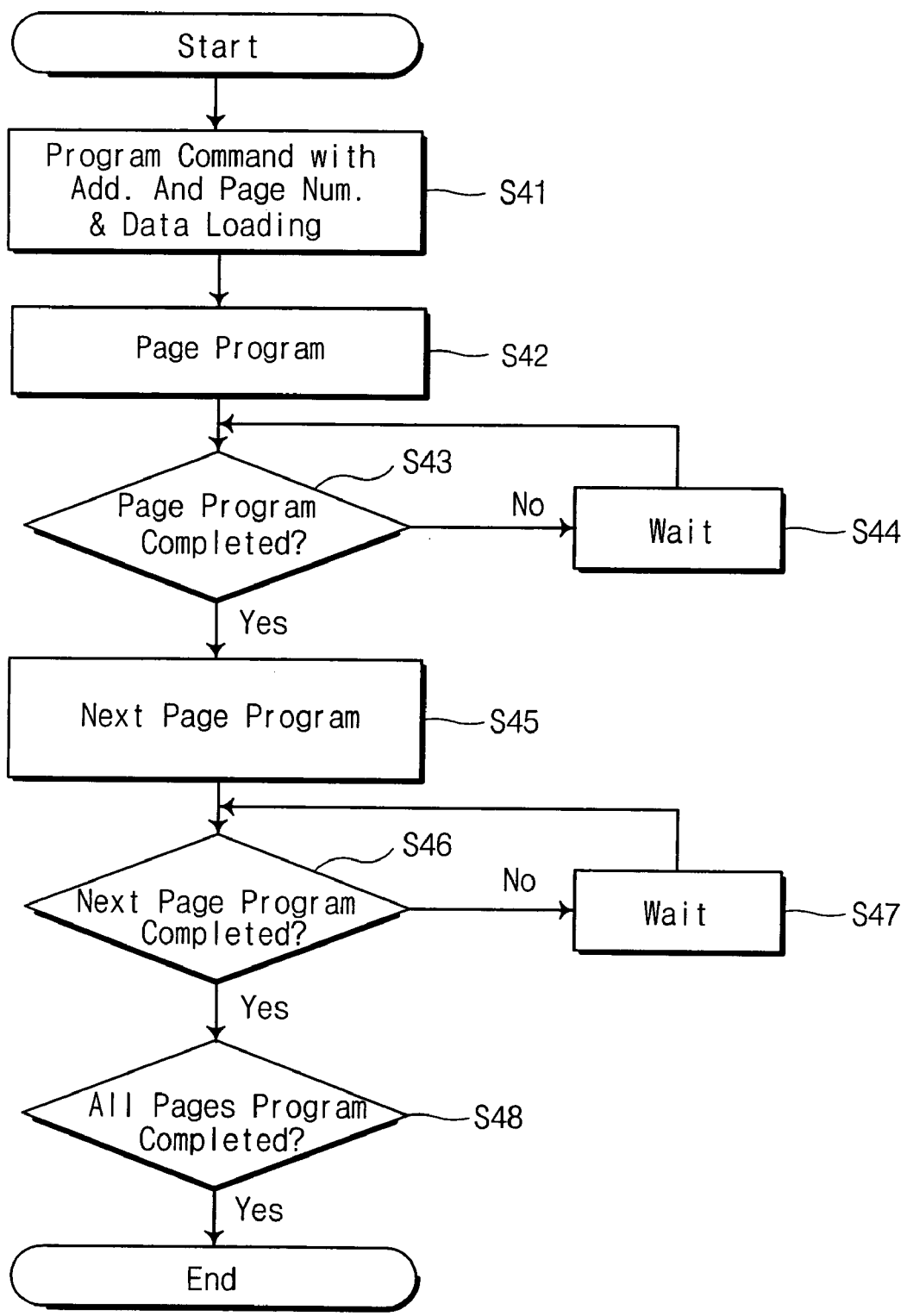
FIGS. 10 and 11 are flowchart and timing diagrams showing a data programming operation in a NAND flash memory.
Figure 11:
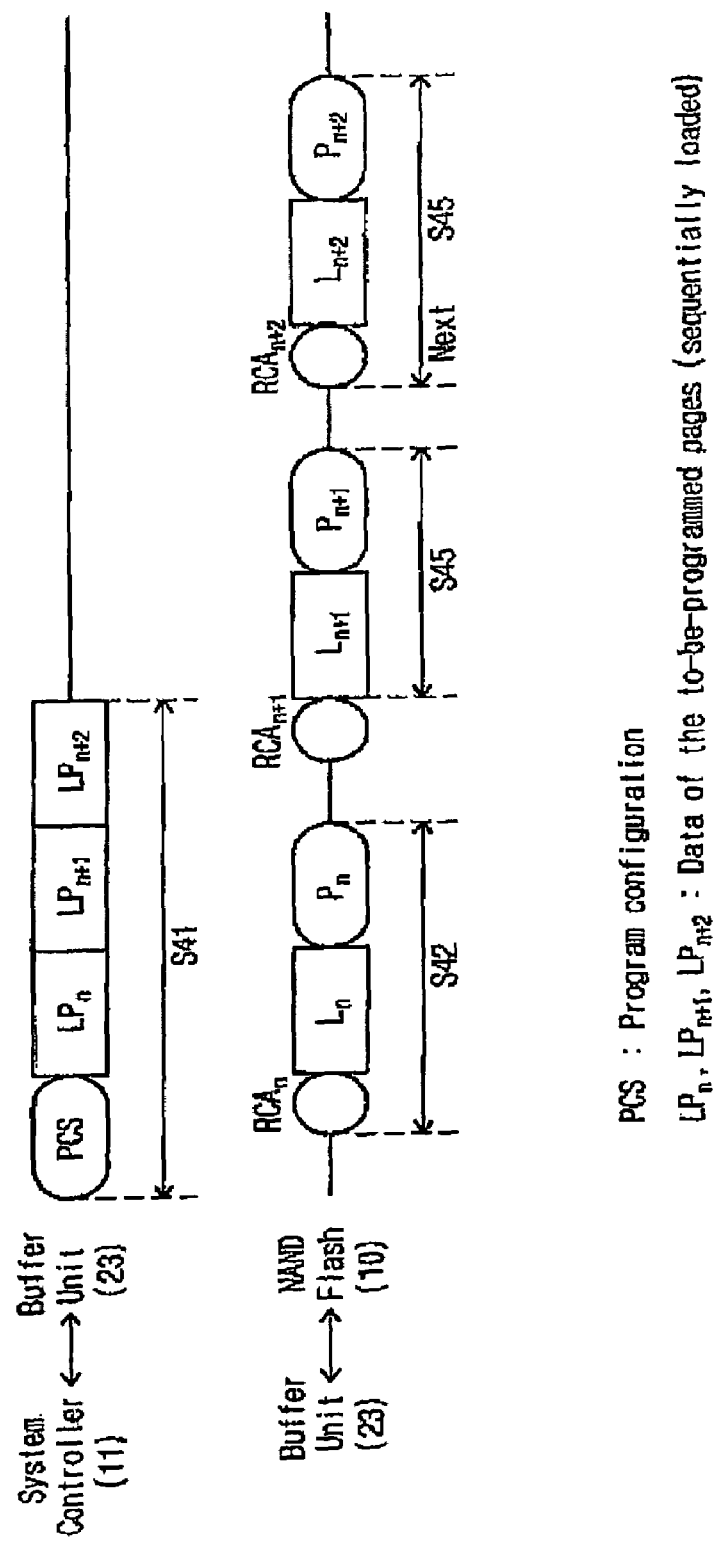

FIGS. 8 and 9 are flowcharts of the interleaved read operation, and FIGS. 10 and 11 are flowchart of the interleaved program operation.

First, the interleaved read operation will be described with reference to FIGS. 8 and 9. As described with reference to FIGS. 3A and 3B, while the NOR flash memory carries out the random access by word unit or byte unit, the NAND flash memory carries out the access operation by page unit. Therefore, the NAND flash memory must wait basically for a maximum latency time of about 10 µs until data is read out (until the system controller 11 reads out data from the NAND flash memory 10). According to the invention, the operation performance can be improved by reducing the latency time in the interleaved read operation.

If the system controller 11 provides the interface unit 20 with information on address of the NAND flash memory 10 and information on page number to be read out, and also commands the interface unit 20 to read out data from the NAND flash memory 10 (S31), the interface unit 20 copies from the NAND flash memory 10 data of the page corresponding to the address assigned by the buffer unit 23 (S32). As shown in FIG. 9, the step S31 contains a period RCS for initializing the read operation and setting address and data amount with respect to the pages to be read out. If the data copy with respect to the current assigned page is completed (S33), the system controller 11 reads out the data of the current page from the buffer unit 23 and the interface unit 20 copies data of next page to the buffer unit 23 (S35). If the data copy of the next page is completed (S36), the system controller 11 checks whether or not the data read and copy are performed as many as the page number set to the interface unit 20 (S38). If not, the process proceeds to the step S35 so that the data read and copy operations with respect to next page are repeated. The process of reading out data of respective pages (e.g., page N, N+1, N+2) from the NAND flash memory 10 consists of a period (e.g., RCAn, RCAn+1, RCAn+2) of providing the read command and address with respect to the page, a period (e.g., LATn, LATn+1, LATn+2) of waiting for the latency time required for the read operation, and a period (e.g., Rn, Rn+1, Rn+2) of performing the data read/copy of corresponding page.

Specifically, referring to FIG. 9, after data of a first page (N, where N is a random page number) is copied from the NAND flash memory 10 to the buffer unit 23 (a period Rn), the data of the first page (N) is transmitted from the buffer unit 23 to the system controller 11 (a period CRn) while data of a second page (N+1) is copied from the NAND flash memory 10 to the buffer unit 23 (a period Rn+1 of the step S35). In other words, after data of the first page is copied to the buffer unit 23 (the step S32), the data transmission to the system controller 11 and the page read/copy are simultaneously performed (the step S35). In the same manner, while data of the second page (N+1) is transmitted from the buffer unit 23 to the system controller 11 (a period CRn+1), data of a third page (N+2) is copied from the NAND flash memory 10 to the buffer unit 23 (a period Rn+2). The above procedures are repeated as many times as there are pages (e.g., N, N+1, and N+2) according to the flow of FIG. 8.

Latency times LATn, LATn+1, and LATn+2 are spent in reading the respective pages when the pages are copied from the NAND flash memory 10 to the buffer unit 23. However, the system controller 11 can receive the read data from the NAND flash memory 10 in pipelined fashion by page unit without spending the latency times (about 10 µs for LATn, LATn+1, or LATn+2).

Hereinafter, the interleaved program operation will be described with reference to FIGS. 10 and 11. In order to program the NAND flash memory 10, an operation of loading to-be-programmed data into the page buffers of the NAND flash memory 10 is needed. The interleave program according to the invention reduces the data loading time.

First, if the system controller 11 provides the interface unit 20 with information on address of the NAND flash memory 10 and information on the page number to be programmed, and also commands the interface unit 20 to program the NAND flash memory 10 (S41), the data corresponding to the to-be-programmed pages are loaded into the buffer unit 23. In other words, the program configuration information is provided to the register unit 22 of the interface unit 20 (PCS), and the data of the to-be-programmed pages are sequentially loaded into the buffer unit 23 (LPn, LPn+1, and LPn+2). Then, according to the order loaded into the buffer unit 23, program command and address with respect to a first page is provided (PCAn), corresponding data are loaded from the buffer unit 23 (Ln), and a program operation to the assigned page is executed (Pn) (S42). Here, as can be seen from the timing state of FIG. 11, it should be noted that data of the next page (e.g., N+1) is loaded into the buffer unit 23 while the program operation is executed to a current page (e.g., N). If the program operation to the current page is completed (S43), the interface unit 20 performs the program operation to the next page (N+1), which is stored in the buffer unit 23, just like the program operation to the first page (PCAn+1, Ln+1, Pn+1) (S45). If the program operation to the next page (e.g., the second page) is completed (S46), the system controller 11 checks whether or not the program operations are performed as many as the page number (e.g., three pages N to N+2) which is set to the interface unit 20 (S48). If not, the process proceeds to the step S45 so that the program operations to next pages are repeated.

According to the program operation to the NAND flash memory of the computer system of the invention, since the program operations to the respective pages are executed after loading the data of the to-be-programmed pages into the buffer unit 23 in advance, the program operation (e.g., Pn) to other pages can be executed while the data of one page is loaded (e.g., LPn+1). As a result, the entire program data loading time for the NAND flash memory is reduced, so that the entire program time is reduced.

Embodiments of the invention will now be described in a non-limiting way.

According to an aspect of the invention, there is provided a computer system that includes a system controller including a central processing unit and a memory bus controller and operating in a first interface mode; a system memory connected with the system controller through the system bus; a NAND flash memory for storing a system driving code, an operating system program and a user data for the computer system; and an interface unit communicating with the system controller through the system bus in the first interface mode and communicating with the NAND flash memory in a second interface mode, the interface unit being synchronized with a clock signal generated therein in response to predetermined command information.

The interface unit includes a host interface unit communicating with the system controller through the system bus in the first interface mode; a register unit for storing a configuration information about the computer system and the NAND flash memory and the command information about the NAND flash memory; a buffer unit for storing data of the NAND flash memory; an oscillator for generating the clock signal in response to the command information; a state machine synchronized with the clock signal, for controlling an inner operation of the interface unit in response to the command information; and a NAND flash interface unit synchronized with the clock signal and communicating with the NAND flash memory via the state machine in the second interface mode.

The interface unit further includes a power-up detector for applying a power sensing signal to the state machine when a power is applied, and an error correcting circuit synchronized with the clock signal, for performing an error test and correction on the data of the NAND flash memory.

The state machine includes: a first block for controlling operations to program the data stored in the buffer unit and predefined error correcting parity bits in the NAND flash memory; a second block for controlling an operation to store the data read out of the NAND flash memory in the buffer unit; a third block for controlling an operation to boot the computer system by using the system booting code stored in the NAND flash memory; a fourth block for controlling an operation to generate the error correcting parity bits during the programming operation of the NAND flash memory and controlling an operation to correct an error by comparing the parity bits stored in the NAND flash memory with new parity bits during the read operation of the NAND flash memory, a fifth block for controlling an operation to erase the data stored in the NAND flash memory; and a sixth block for controlling a reset command applied to the NAND flash memory and resets of registers within the interface unit.

According to another aspect of the invention, the interface unit includes a first interface unit communicating with the system controller through the system bus in the first interface mode; a second interface unit synchronized with the clock signal and communicating with the NAND flash memory in the second interface mode; a storage unit for storing information and data exchanged between the first and second interface units; and a control unit synchronized with the clock signal, for controlling a transmission of the information and data between the first and second interface units. The storage unit includes a register unit for storing a configuration information about the compute system and the NAND flash memory and the command information about the NAND flash memory; and a buffer unit for storing data of the NAND flash memory.

According to still another aspect of the invention, a booting method of a computer system with a NAND flash memory includes a first step of copying a system booting code to a buffer from the NAND flash memory in response to a power applying detecting state; a second step of initializing the computer system according to the system booting code stored in the buffer and copying an operating system code to a programmable memory from the NAND flash memory; and a third step of executing the operating system code.

In addition, in a computer system according to embodiments of the invention, there are disclosed apparatus and method for reading and programming the NAND flash memory in a high performance fashion.

According to still another aspect of the invention, there is provided a method for reading out data from a NAND flash memory in a computer system with a system controller, a buffer and the NAND flash memory. The method includes a first step of setting commands, addresses and pages to be read out to the NAND flash memory; a second step of copying the first page data of the pages to the buffer; and a third step of copying the second page data of the pages to the buffer from the NAND flash memory while transmitting the first page data from the buffer to the system controller. The third step is repeated until the data copying of the set pages is completed. The data of the set pages are transmitted successively.

According to a different aspect of the invention, there is provided a method for programming data from a NAND flash memory in a computer system with a system controller, a buffer and the NAND flash memory. The method includes a first step of setting commands, addresses and pages to be programmed to the NAND flash memory; a second step of successively loading data necessary for the pages to be programmed from the system controller to the buffer; and a third step of sequentially executing a program for the pages by using the data loaded to the buffer. The program for another page is executed while the data to one page of the pages is loaded to the buffer.

As described above, according to the method of the invention, the NAND flash memory can be more simply and effectively used as the bootstrap device in the computer system. Particularly, with the use of the interface unit in the read operation to the NAND flash memory, the latency time is reduced and the entire program data loading time is also reduced during the program operation. Additionally, the NAND flash memory can be used as the bootstrap and storage device with respect to the system controller having the NOR flash interface mode. As a result, the invention proposes a method that more easily and efficiently utilizes the NAND flash memory as the bootstrap and data storage device, thereby reducing costs required for the system configuration.

It will be apparent to those skilled in the art that various modifications and variations can be made to the exemplary embodiments described above. Thus, it is intended that the invention embrace all modifications and variations provided they come within the scope of the appended claims and their equivalents.

We claim:

1. A computer system comprising:
   a system controller including a central processing unit and a memory bus controller and configured to operate in a first interface mode;
   a system memory connected with the system controller through the system bus;
   a NAND flash memory configured to store a system driving code, an operating system program, and user data for the computer system; and
   an interface unit configured to communicate with the system controller through the system bus in the first interface mode and configured to communicate with the NAND flash memory in a second interface mode, the interface unit being synchronized with a clock signal generated in response to predetermined command information;
   wherein the interface unit comprises:
      a host interface unit configured to communicate with the system controller through the system bus in the first interface mode;
      a register unit configured to store configuration information about the computer system, the NAND flash memory, and the command information;

a buffer unit configured to store data of the NAND flash memory;

an oscillator configured to generate the clock signal in response to the command information;

a state machine synchronized with the clock signal and configured to control an inner operation of the interface unit in response to the command information;

a NAND flash interface unit synchronized with the clock signal and configured to communicate with the NAND flash memory via the state machine in the second interface mode;

a power-up detector configured to apply a power sensing signal to the state machine when power is applied; and an error correcting circuit synchronized with the clock signal and configured to perform an error test and correction on the data of the NAND flash memory; and wherein the state machine comprises:

a first block configured to control operations to program the data stored in the buffer unit and predefined error correcting parity bits in the NAND flash memory;

a second block configured to control an operation to store the data read out of the NAND flash memory in the buffer unit;

a third block configured to control an operation to boot the computer system by using the system bootstrap code stored in the NAND flash memory; and a fourth block configured to control an operation to generate the error correcting parity bits during the programming operation of the NAND flash memory and configured to control an operation to correct an error by comparing the parity bits stored in the NAND flash memory with new parity bits during the read operation of the NAND flash memory.

2. The computer system of claim 1, wherein the state machine further comprises:

a fifth block configured to control an operation to erase the data stored in the NAND flash memory; and a sixth block configured to apply a reset command to the NAND flash memory and to a plurality of registers within the interface unit.

3. A computer system comprising:

a system controller including a central processing unit and a memory bus controller and configured to operate in a first interface mode;

a system memory connected with the system controller through the system bus;

a NAND flash memory configured to store a system driving code, an operating system program, and user data for the computer system; and an interface unit configured to communicate with the system controller through the system bus in the first interface mode and configured to communicate with the NAND flash memory in a second interface mode, the interface unit being synchronized with a clock signal generated in response to predetermined command information;

wherein the interface unit comprises:

a first interface unit configured to communicate with the system controller through the system bus in the first interface mode;

a second interface unit synchronized with the clock signal and configured to communicate with the NAND flash memory in the second interface mode;

a storage unit configured to store information and data exchanged between the first and second interface units; and a control unit synchronized with the clock signal and configured to control a transmission of the information and data between the first and second interface units;

wherein the control unit comprises:

a first block configured to control operations to program the data stored in a buffer unit and predefined error correcting parity bits in the NAND flash memory;

a second block configured to control an operation to store the data read out of the NAND flash memory in the buffer unit;

a third block configured to control an operation to boot the computer system by using the system bootstrap code stored in the NAND flash memory; and a fourth block configured to control an operation to generate the error correcting parity bits during the programming operation of the NAND flash memory and configured to control an operation to correct an error by comparing the parity bits stored in the NAND flash memory with new parity bits during the read operation of the NAND flash memory.

4. The computer system of claim 3, wherein the storage unit comprises:

a register unit configured to store configuration information about the computer system, the NAND flash memory, and the command information about the NAND flash memory; and the buffer unit configured to store data of the NAND flash memory.

5. The computer system of claim 3, wherein the interface unit further comprises a power-up detector configured to apply a power sensing signal to the state machine when power is applied.

6. The computer system of claim 5, wherein the interface unit further comprises an error correcting circuit synchronized with the clock signal and configured to perform an error test and correction on the data of the NAND flash memory.

7. The computer system of claim 3, wherein the control unit further comprises:

a fifth block configured to control an operation to erase the data stored in the NAND flash memory; and a sixth block configured to apply a reset command to the NAND flash memory and to a plurality of registers within the interface unit.

* * * * *

UNITED STATES PATENT AND TRADEMARK OFFICE
CERTIFICATE OF CORRECTION

PATENT NO. : 7,234,049 B2
APPLICATION NO. : 10/629049
DATED : June 19, 2007
INVENTOR(S) : Young-Joon Choi et al.

Page 1 of 2

It is certified that error appears in the above-identified patent and that said Letters Patent is hereby corrected as shown below:

In the Drawings  Delete: "Sheet 9/11"
Insert:

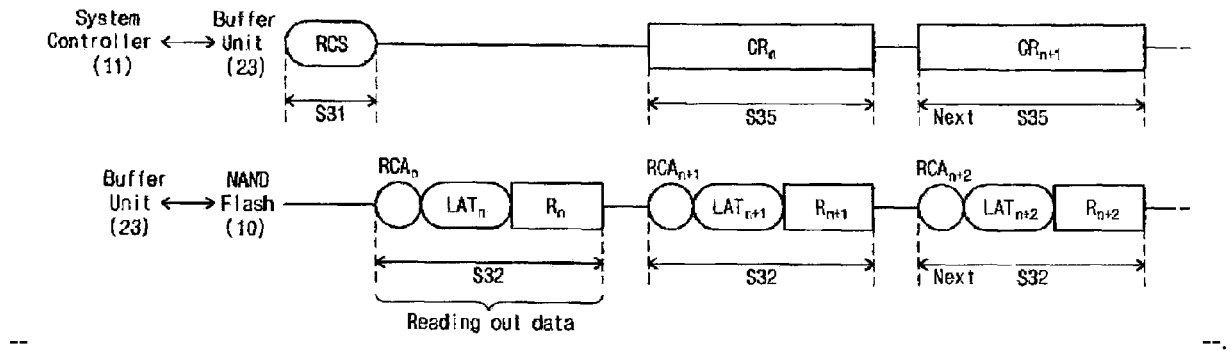

Signed and Sealed this
Twenty-ninth Day of November, 2011

David J. Kappos
*Director of the United States Patent and Trademark Office*

CERTIFICATE OF CORRECTION (continued)

U.S. Pat. No. 7,234,049 B2

In the Drawings    Delete: "Sheet 11/11"
Insert:

Fig. 11

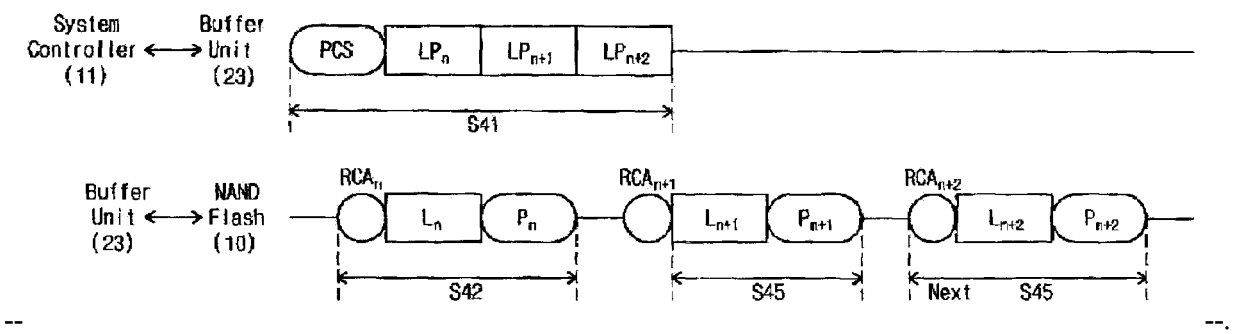

Column 9, line 39, the word "contigured" should read -- configured --.